(12) United States Patent
Soci et al.

(10) Patent No.: US 11,724,844 B2
(45) Date of Patent: Aug. 15, 2023

(54) ULTRASONIC SEALING DEVICE

(71) Applicant: Tetra Laval Holdings & Finance S.A., Pully (CH)

(72) Inventors: Fabio Soci, Modena (IT); Luca Gentili, Piceno (IT); Fabrizio Sighinolfi, Nonantola (IT); Massimiliano Barbi, Castelfranco Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 21 days.

(21) Appl. No.: 17/286,840

(22) PCT Filed: Oct. 3, 2019

(86) PCT No.: PCT/EP2019/076833
§ 371 (c)(1),
(2) Date: Apr. 20, 2021

(87) PCT Pub. No.: WO2020/083625
PCT Pub. Date: Apr. 30, 2020

(65) Prior Publication Data
US 2021/0347510 A1    Nov. 11, 2021

(30) Foreign Application Priority Data
Oct. 24, 2018    (EP) .................................... 18202267

(51) Int. Cl.
*B29C 65/08*    (2006.01)
*B65B 51/22*    (2006.01)
*B29C 65/00*    (2006.01)

(52) U.S. Cl.
CPC ............ *B65B 51/225* (2013.01); *B29C 65/08* (2013.01); *B29C 66/1122* (2013.01); *B29C 66/849* (2013.01)

(58) Field of Classification Search
CPC .............................. B29C 65/08; B65B 51/225
(Continued)

(56) References Cited

U.S. PATENT DOCUMENTS 8,052,816 B2 *   11/2011   Klinstein .......... B29C 66/30223
                                                       156/64
2002/0124662 A1    9/2002   Suzuki et al.
(Continued)

FOREIGN PATENT DOCUMENTS

CN    103419364 A    12/2013
CN    105170436 A    12/2015
(Continued)

OTHER PUBLICATIONS

International Search Report for corresponding Application No. PCT/EP2019/076833, dated Dec. 10, 2019.
(Continued)

*Primary Examiner* — James D Sells
(74) *Attorney, Agent, or Firm* — Renner, Otto, Boisselle & Sklar, LLP

(57) ABSTRACT

An ultrasonic sealing device including a sonotrode for sealing a packaging material, including a piezoelectric transducer to generate ultrasonic acoustic vibrations for the sealing, a housing, a power circuit connected to the piezoelectric transducer. The power circuit is enclosed in the housing, and an absorbent arranged in the housing to absorb moisture in an atmosphere therein to lower humidity. A method of controlling humidity in an ultrasonic sealing device is also described.

16 Claims, 3 Drawing Sheets

(58) Field of Classification Search
USPC .................................................... 156/580.1
See application file for complete search history.

(56) References Cited

U.S. PATENT DOCUMENTS

| | | |
|---|---|---|
| 2004/0200056 A1 | 10/2004 | Suzuki et al. |
| 2009/0188966 A1 | 7/2009 | Klinstein |

FOREIGN PATENT DOCUMENTS

| | | |
|---|---|---|
| DE | 199 06 873 A1 | 8/2000 |
| JP | H0953868 A | 2/1997 |
| JP | 2002262394 A | 9/2002 |
| JP | 2009538791 A | 11/2009 |
| WO | 2007138372 A1 | 12/2007 |

OTHER PUBLICATIONS

Cody Hostick: Moisture Protection of Electronics—Efficient Plant, Sep. 18, 2013, pp. 1-11, XP055575294, Retrieved from the Internet: URL:https://www.efficientplantmag.com/2013/09/moisture-protection-of-electronics/ [retrieved on Apr. 20, 2021].

* cited by examiner

ULTRASONIC SEALING DEVICE

TECHNICAL FIELD

The present invention relates to an apparatus for sealing packaging containers. More specifically, the present invention relates to an ultrasonic sealing device for sealing packaging material for such packaging containers and a method of controlling humidity in such ultrasonic sealing device.

BACKGROUND

In the manufacturing of packaging containers a web of packaging material is typically longitudinally sealed to form a tube around a fill pipe in a filling machine. A transversal seal is made to the tube which is then filled with a desired liquid food product. A second transversal seal is made which also cuts the package from the entirety of the tube of material. The filled package is then folded and shaped to obtain the final packaging container. Different sealing methods are used for such sealing, such as inductive sealing or ultrasonic sealing. The packaging material is usually composed of paperboard base material with both sides coated with a thermoplastic resin material such as polyethylene. Additionally, the paperboard base material may have a gas barrier layer which may also be coated with a thermoplastic resin material. In ultrasonic sealing, ultrasonic energy generates heat in the thermoplastic resin material through transmission of vibrations from an ultrasonic horn to the packaging material. The thermoplastic resin is melted and opposing surfaces of the packaging material, being compressed towards each other, are sealed together. Ultrasonic sealing systems utilizes piezo stack converters to transform electrical energy to mechanical energy. The piezo stack needs to be supplied with a high voltage in the order of magnitude of thousands of volts. Previous ultrasonic sealing systems typically rely on complex solutions in order for the sealing device to operate within required environmental conditions when being supplied with such high voltages. Such previous solutions require more resources and maintenance. Further, implementation is difficult due to compatibility issues with some packaging machine systems in the production line. For example, conveyor systems based on linear motor technology have been proposed for manipulating packaging containers in the production line. These conveyor systems typically comprise a closed loop track, and a plurality of movable objects or carts, which are independently moved along the track by individually controlling a plurality of solenoids along the track. The implementation of an ultrasonic sealing system must thus accommodate such independently movable carts.

SUMMARY

It is an object of the invention to at least partly overcome one or more limitations of the prior art. In particular, it is an object to provide an improved ultrasonic sealing device, in particular allowing for facilitating the control of the environmental conditions in high voltage piezoelectric power circuits, and in particular when implemented in conveyor systems comprising a plurality independently movable carts along a track. It is an object to provide a related method of controlling humidity in an ultrasonic sealing device.

In a first aspect of the invention, this is achieved by an ultrasonic sealing device comprising a sonotrode for sealing a packaging material, comprising a piezoelectric transducer to generate ultrasonic acoustic vibrations for said sealing, a housing, a power circuit connected to the piezoelectric transducer, wherein the power circuit is enclosed in the housing, and an absorbent arranged in the housing to absorb moisture in an atmosphere therein to lower humidity.

In a second aspect of the invention, this is achieved by a method of controlling humidity in an ultrasonic sealing device having a piezoelectric transducer to generate ultrasonic acoustic vibrations for sealing a packaging material and a power circuit enclosed in a housing and being connected to the piezoelectric transducer, the method comprising absorbing moisture in an atmosphere in the housing with an absorbent arranged in the housing.

In a third aspect of the invention, this is achieved by use of an absorbent in a housing of an ultrasonic sealing device, the housing enclosing a power circuit connected to a piezoelectric transducer to generate ultrasonic acoustic vibrations for sealing a packaging material with said ultrasonic sealing device.

In a fourth aspect of the invention, this is achieved by a packaging machine comprising a device according to the first aspect, and/or a packaging machine performing the method according to the second aspect.

Further examples of the invention are defined in the dependent claims, wherein features for the first aspect may be implemented for the subsequent aspects, and vice versa.

Having an absorbent arranged in the housing enclosing the piezoelectric power circuit allows for absorbing moisture in the atmosphere inside the housing, which prevents short circuit and component failure of the high voltage circuit.

Still other objectives, features, aspects and advantages of the invention will appear from the following detailed description as well as from the drawings.

DRAWINGS

Embodiments of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
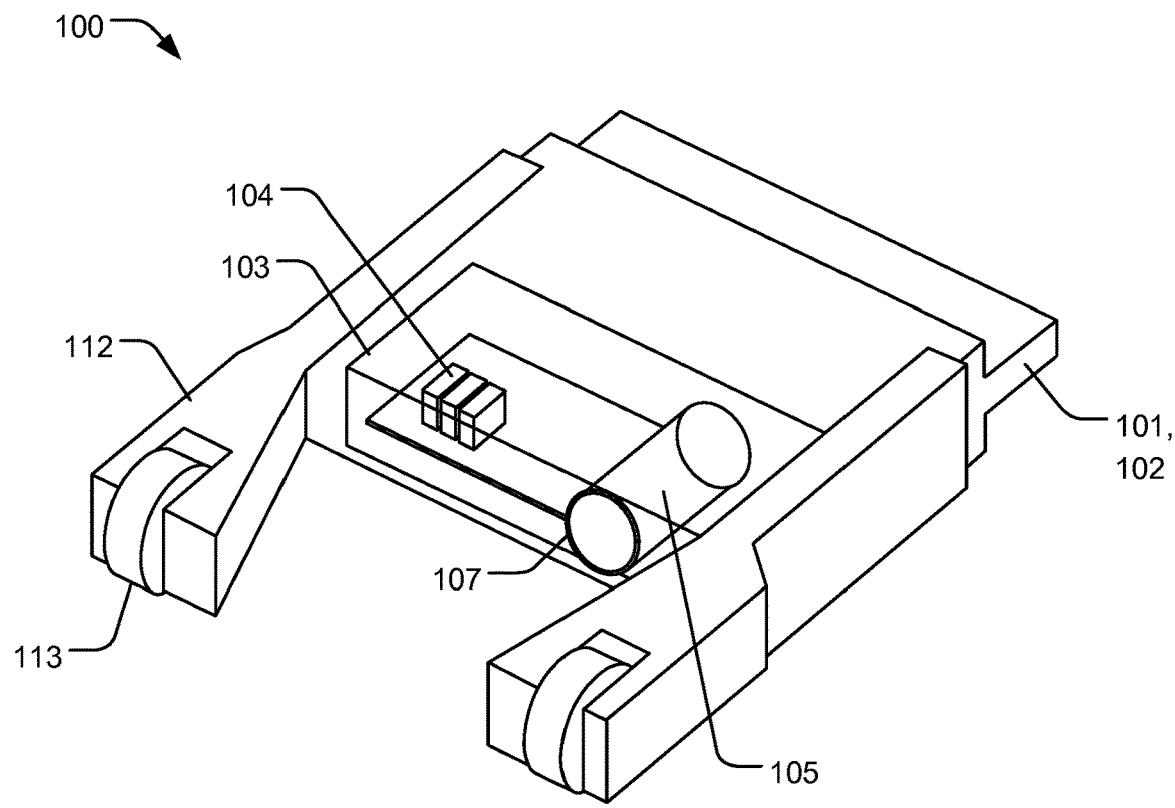
FIG. 1 is a schematic illustration of an ultrasonic sealing device.

FIG. 1 is a schematic illustration of an ultrasonic sealing device 100 comprising a sonotrode 101 for sealing a packaging material (not shown). The ultrasonic sealing device 100 comprises a piezoelectric transducer 102 to generate ultrasonic acoustic vibrations for sealing the packaging material for manufacturing packaging containers. The ultrasonic sealing device 100 comprises a housing 103 and a power circuit 104 connected to the piezoelectric transducer 102. The power circuit 104 is enclosed in the housing 103 and is a high-voltage circuit for powering the piezoelectric transducer 102. The ultrasonic sealing device 100 comprises an absorbent 105 which is arranged in the housing 103 to absorb moisture in the atmosphere inside the housing 103. The humidity inside the housing 103 is thereby lowered. By having an absorbent 105 inside the housing 103 of the power circuit 104 the humidity can be controlled and kept below critical levels for the high-voltage piezoelectric power circuit 104. Condensation is thus prevented, which may otherwise cause short circuit and component failure of the circuit 104. Complex systems previously used to control the humidity, e.g. using compressed air systems, can thus be dispensed with. The complexity and cost of the ultrasonic sealing device 100 can thus be reduced while complying with the necessary environmental requirements of the power circuit 104. Further, reducing the complexity provides for facilitating the implementation of the ultrasonic sealing device 100 in conveyor systems based on linear motor technology where the ultrasonic sealing device 100 is independently movable along a track, as further described in relation to FIG. 3 below. E.g. installation of a system using compressed air in such conveyor system would increase the complexity and cost thereof, and potentially affect the performance of the conveyor system so that the speed of operation would be reduced. Having an absorbent 105 arranged in the housing 103 enclosing the piezoelectric power circuit 104 thus provides for maintaining high performance of such conveyor system utilizing independently movable sealing devices 100 and providing for high throughput of the production line.

Figure 2:
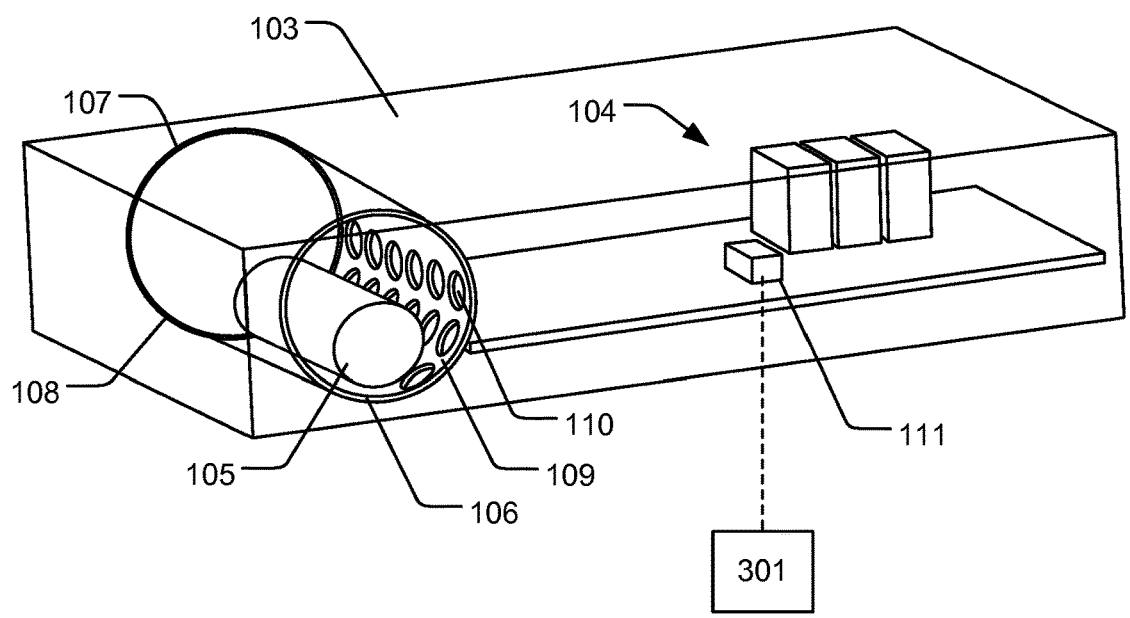
FIG. 2 is a schematic illustration of a housing for a power circuit of an ultrasonic sealing device.

The ultrasonic sealing device 100 may comprise a container 106 to hold the absorbent 105 in a defined position in the housing 103. This provides for facilitated optimization of the position of the absorbent 105 and improved control of the humidity in the housing 103. E.g. some parts of the space inside the housing 105 may be more prone to condensation. Further, holding the absorbent 105 in a defined position provides for a more robust ultrasonic sealing device 100 where the risk of having the absorbent 105 interfering with neighbouring components is reduced, as the ultrasonic sealing device 100 may undergo rapid movements in different sealing operations. FIG. 2 is a schematic illustration showing an example of a container 106 holding the absorbent 105 in a defined position in the housing 103. It should be understood that FIG. 2 is an example and that the container 106 may hold the absorbent 105 in various optimized positions depending on the configuration of the sealing device 100.

In one example, the container 106 may hold the absorbent 105 in a defined position adjacent the power circuit 104, as schematically illustrated in FIG. 2. This provides for further reducing the risk of having a condensation of liquid close to the high-voltage components of the power circuit 104. A safer operation of the ultrasonic sealing device 100 is thus provided with less risk of component damage and interruptions of the sealing application and the overall production line.

The container 106 may comprise a fixation element 107 to removably attach the container 106 to the housing 103. Having the container 106 removably attachable to the housing 103 provides for facilitated installation and replacement of the absorbent 105 when needed. Maintenance is thus facilitated with a minimum of impact on the production line as the time spent on such replacement can be minimized.

The container 106 may be cylinder-shaped and the fixation element 107 may comprise threads being screwable into an opening 108 of the housing 103. This provides for facilitating the fixation of the container 106 to the housing 103, and further subsequent detachment of the container 106 for replacement of the absorbent 105. It should be understood that the container 106 and/or the housing 103 may comprise various other fixation elements 107, such as clasps, hooks clips, locks, flanges, wires, etc. to removably attach the container 106 to the housing 103. Although a cylinder-shaped container 106 comprising threads being screwable into an opening 108 of the housing 103 may provide for a particularly facilitated and robust attachment, it is conceivable that the container 106 may have various shapes, such as rectangular, oblong, or round, in combination any of the above mentioned fixation elements 107.

The container 106 may comprise a wall 109 enclosing the absorbent 105. The wall 109 may comprise a plurality of perforations 110, as schematically illustrated in FIG. 2. Thus, while the container 106 allows for a secure positioning of the absorbent 105 in the housing 103, the perforations 110 provides for improving the circulation of the air inside the housing 103 around the absorbent 105, which allows for increasing the absorbent's 105 uptake of moisture in the air and a more effective lowering of the humidity in the housing 103. The shape and number of the perforations 110 in the wall 109 of the container 106 may be varied to optimize the contact between the absorbent 105 and the atmosphere in the housing 103.

The absorbent 105 may comprise a desiccant. A desiccant is a hygroscopic substance that induces or sustains a state of dryness (desiccation) in its vicinity. I.e. a desiccant is the opposite of a humectant. The desiccant may be a solid material that absorbs water. The desiccant may be in other forms than a solid, and may work through other principles to absorb water, such as chemical bonding of water molecules. Having an absorbent 105 that comprises a desiccant provides for an effective and resource efficient control of the humidity in the atmosphere inside the housing 103.

The desiccant may comprise silica. Having a desiccant comprising silica allows for easy handling of the absorbent 105, as well as high efficiency in relation to the resources required. The efficiency of the desiccant may be measured as a ratio of water storable in the desiccant relative to the mass of desiccant. In other examples, the desiccant may comprise activated charcoal, and/or calcium sulfate, and/or calcium chloride, and/or molecular sieves such as zeolites, and/or a moisture absorbing polymer.

The ultrasonic sealing device 100 may comprise a sensor 111 to detect moisture in the atmosphere inside the housing 103. The sensor 111 may be in communication with a control device 301, as schematically illustrated in FIG. 2. The sensor 111 may communicate with the control device 301 via a wireless communication protocol. The control device 301 is configured to receive sensor data from the sensor 111. The sensor data may be indicative of the amount of moisture, i.e. the amount of water in the atmosphere inside the housing 103. The sensor 111 may thus detect a level of humidity in the atmosphere. The control device 301 may be configured to notify a user of a threshold level of moisture in the atmosphere. A measure of the amount of moisture may thus be determined, as e.g. a level of absolute or relative humidity, and compared to a predefined threshold level. A user may receive an alert notification when the predefined threshold level is exceeded. This provides for facilitated humidity control of the ultrasonic sealing device 100, since such notification may trigger replacement of the absorbent 105.

Figure 3:
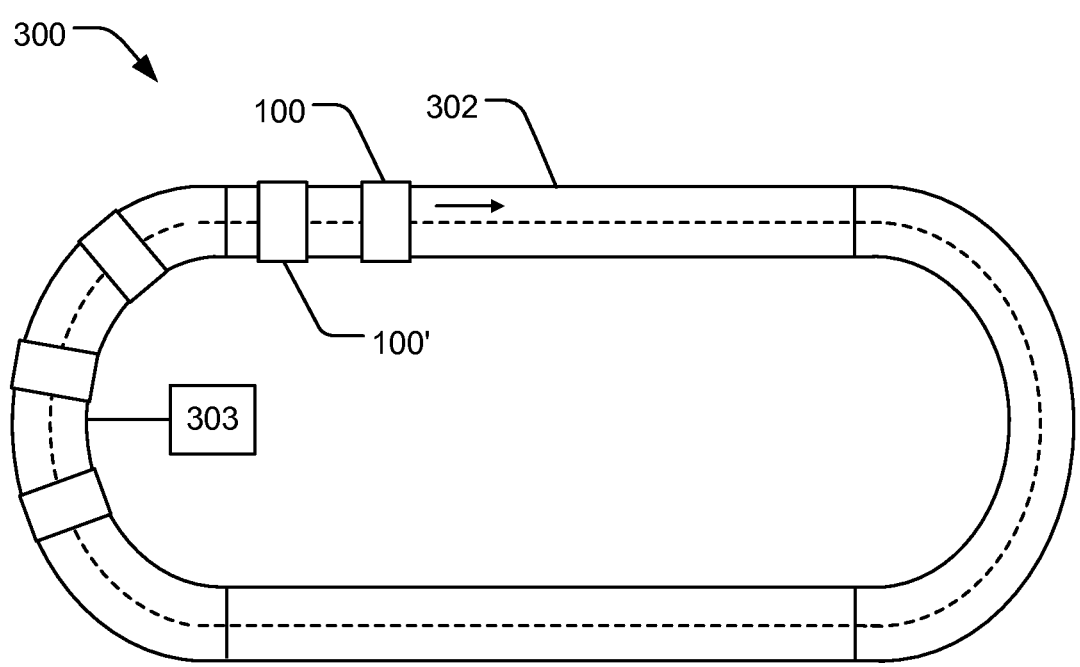
FIG. 3 is a schematic illustration of a conveyor system with a plurality of movable ultrasonic sealing devices.

The ultrasonic sealing device 100 may comprise a frame 112, as schematically illustrated in the example of FIG. 1. The sonotrode 101 and housing 103 may be attached to the frame 112, as further shown in FIG. 1. The ultrasonic sealing device 100 may comprise a track guide 113 configured to engage with a track 302 of a conveyor system 300, as schematically illustrated in FIG. 3, so that the frame 112 and ultrasonic sealing device 100 is movable along the track 302. The track guide 113 may comprise rollers arranged at opposite sides of the frame to engage with a track 302. The conveyor system 300 may comprise a control unit 303 configured to control the individual positions of a plurality of ultrasonic sealing devices 100, 100', along the track 302. Having an ultrasonic sealing device 100 with an absorbent 105 as specified above provides for a facilitated implementation in such conveyor systems 300 while having effective control of the humidity level inside the ultrasonic sealing device 100.

The housing 103 may be formed as an integrated enclosure in the frame 112. This provides for a robust ultrasonic sealing device 100 while the absorbent 105 allows for an effective control of the humidity level in the space inside the integrated enclosure.

Figure 4A:
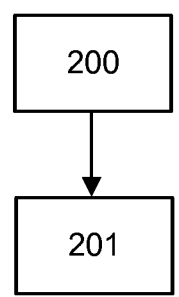
FIG. 4a is a flowchart of a method of controlling humidity in an ultrasonic sealing device.

FIG. 4a is a flowchart of a method 200 of controlling humidity in an ultrasonic sealing device 100. As described above, the ultrasonic sealing device 100 comprises an piezoelectric transducer 102 to generate ultrasonic acoustic vibrations for sealing a packaging material and a power circuit 104 enclosed in a housing 103. The power circuit 104 is connected to the piezoelectric transducer 102. The method 200 comprises absorbing 201 moisture in an atmosphere in the housing 103 with an absorbent 105 arranged in the housing 103. The method 200 thus provides for the advantageous benefits as described above in relation to the ultrasonic sealing device 100 and FIGS. 1-3. The method 200 provides for reducing the risk of component failure of the high voltage piezoelectric power circuit 104 while facilitating the implementation of the ultrasonic sealing device 100 in packaging machines utilizing conveyor systems 300 as described in relation to FIG. 3.

Figure 4B:
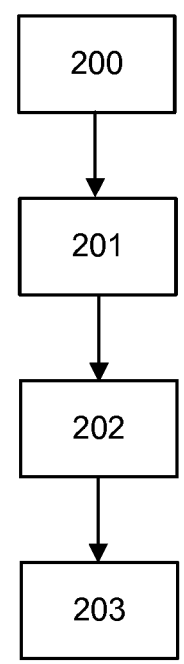
FIG. 4b is a flowchart of a method of controlling humidity in an ultrasonic sealing device.

FIG. 4b is another flowchart of a method 200 of controlling humidity in an ultrasonic sealing device 100. The method 200 may comprise detecting 202 a threshold level of moisture in the atmosphere inside the housing 103, and notifying 203 a user of said threshold level. A measure of the amount of moisture may thus be detected, as e.g. a level of absolute or relative humidity. A user may receive an alert notification when the defined threshold level is reached. This provides for facilitated humidity control of the ultrasonic sealing device 100, since such notification may trigger replacement of the absorbent 105.

A computer program product is provided comprising instructions which, when the program is executed by a computer, cause the computer to carry out the steps of the method 200 of detecting 202 and notifying 203 as described above.

A use of an absorbent 105 in a housing 103 of an ultrasonic sealing device 100 is provided, with the advantageous benefits as described above in relation to FIGS. 1-4. As mentioned, the housing 103 encloses a power circuit 104 connected to a piezoelectric transducer 102 to generate ultrasonic acoustic vibrations for sealing a packaging material with the ultrasonic sealing device 100.

A packaging machine (not shown) is provided comprising an ultrasonic sealing device 100 as described above in relation to FIGS. 1-2. Alternatively or in addition, the packaging machine executes the method 200 as described above. The packaging machine thus provides for the advantageous benefits as described above in relation to the ultrasonic sealing device 100 and the method 200.

From the description above follows that, although various embodiments of the invention have been described and shown, the invention is not restricted thereto, but may also be embodied in other ways within the scope of the subject-matter defined in the following claims.

The invention claimed is:

1. An ultrasonic sealing device comprising:
   a sonotrode for sealing a packaging material comprising:
      a piezoelectric transducer to generate ultrasonic acoustic vibrations for said sealing,
   a housing,
   a power circuit connected to the piezoelectric transducer, wherein the power circuit is enclosed in the housing,
   an absorbent arranged in the housing to absorb moisture in an atmosphere therein to lower humidity,
   a frame, wherein the sonotrode and the housing are attached to the frame, and
   a track guide configured to engage with a track so that the frame is movable along the track.

2. The ultrasonic sealing device according to claim 1, comprising a container to hold the absorbent in a defined position in the housing.

3. The ultrasonic sealing device according to claim 2, wherein the defined position is adjacent the power circuit.

4. The ultrasonic sealing device according to claim 2, wherein the container comprises a fixation element to removably attach the container to the housing.

5. The ultrasonic sealing device according to claim 4, wherein the container is cylinder-shaped and the fixation element comprises threads being screwable into an opening of the housing.

6. The ultrasonic sealing device according to claim 2, wherein the container comprises a wall enclosing the absorbent, and wherein the wall comprises a plurality of perforations.

7. The ultrasonic sealing device according to claim 1, wherein the absorbent comprises a desiccant.

8. The ultrasonic sealing device according to claim 7, wherein the desiccant comprises silica, and/or activated charcoal, and/or calcium sulfate, and/or calcium chloride, and/or molecular sieves, and/or a moisture absorbing polymer.

9. The ultrasonic sealing device according to claim 8, comprising
   a sensor to detect moisture in said atmosphere, wherein the sensor is in communication with a control device configured to notify a user of a threshold level of moisture in the atmosphere.

10. The ultrasonic sealing device according to claim 1, wherein the housing is formed as an integrated enclosure in the frame.

11. A method of controlling humidity in an ultrasonic sealing device having: a piezoelectric transducer of a sonotrode to generate ultrasonic acoustic vibrations for sealing a packaging material, a power circuit enclosed in a housing and being connected to the piezoelectric transducer, a frame, wherein the sonotrode and the housing are attached to the frame, and a track guide configured to engage with a track so that the frame is movable along the track; the method comprising:
   absorbing moisture in an atmosphere in the housing with an absorbent arranged in the housing.

12. The method according to claim 11, comprising:
   detecting a threshold level of moisture in said atmosphere, and
   notifying a user of said threshold level.

13. A method comprising using an absorbent in a housing of an ultrasonic sealing device, the housing enclosing a power circuit connected to a piezoelectric transducer of a sonotrode to generate ultrasonic acoustic vibrations for sealing a packaging material with said ultrasonic sealing device; wherein the ultrasonic sealing device comprises a frame, wherein the sonotrode and the housing are attached to the frame, and a track guide configured to engage with a track so that the frame is movable along the track.

14. A packaging machine comprising an ultrasonic sealing device according to claim 1.

15. The ultrasonic sealing device according to claim 1, wherein the ultrasonic sealing device is in the form of a cart and the track guide is in the form of rollers configured to engage with the track.

16. A conveyor system, comprising:
- the ultrasonic sealing device according to claim 1, wherein the track guide engages with the track to move the frame along the track.

* * * * *